Dec. 11, 1934.  G. C. BROWN  1,983,656
MOTOR CONTROL
Filed June 15, 1931

Inventor
Glendon C. Brown
By Frank Hubbard
Attorney

Patented Dec. 11, 1934

1,983,656

UNITED STATES PATENT OFFICE 1,983,656

MOTOR CONTROL

Glendon C. Brown, Milwaukee, Wis., assignor to Cutler-Hammer, Inc., Milwaukee, Wis., a corporation of Delaware Application June 15, 1931, Serial No. 544,348

6 Claims. (Cl. 172—274)

This invention relates to controllers for electric motors and is particularly applicable to alternating current motors whose speed is controlled by resistance in the secondary or armature circuit and whose direction of rotation is reversed by plugging, i. e. the reversal of the primary winding.

An object of the invention is to provide an improved controller which will bring the motor to an accurate stop by plugging and which will disconnect it from the power supply when the motor has come substantially to a standstill.

Another object is to maintain a constant speed of the motor at any desired value between maximum and zero speed.

Another object is to provide a controller which will accomplish the aforementioned results, in response to changes in the frequency in the secondary circuit of the motor.

Another object is to provide a controller whose operation is substantially independent of variations in line voltage.

Another object of the invention is to provide a controller whose operation is substantially independent of variations of the frequency of the supply voltage.

Another object is to provide control for a gaseous electron tube to respond selectively to frequencies below and above a given value.

Other objects and advantages will hereinafter appear.

The accompanying drawing illustrates one system embodying my invention but it will be readily understood that the invention is capable of various modifications, all within the scope of the specification and the appended claims.

Figure 1:
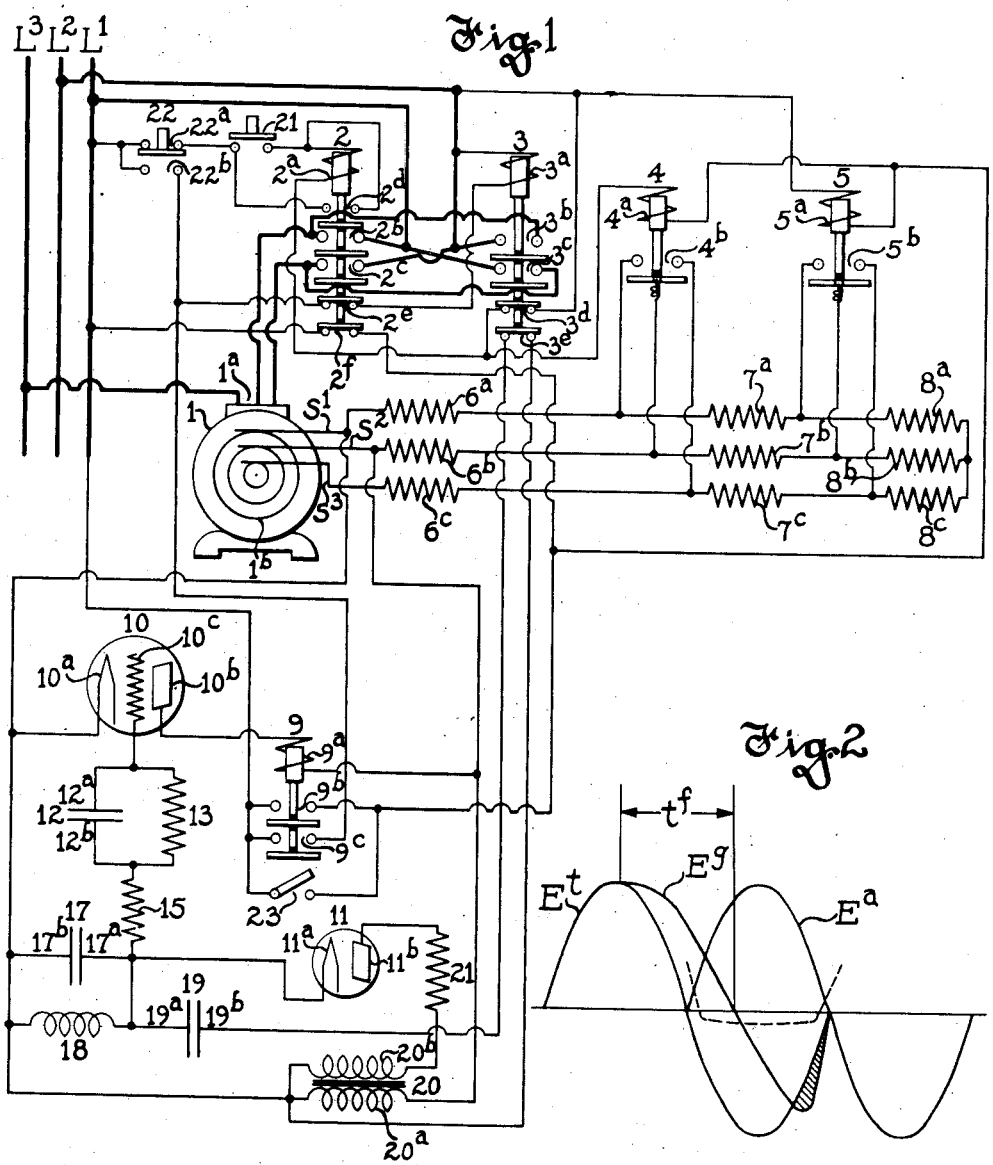
Figure 2:
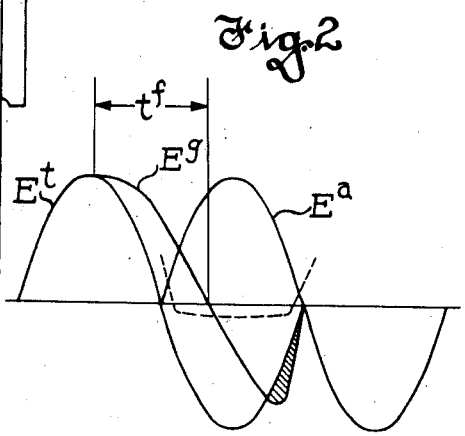
Figure 3:
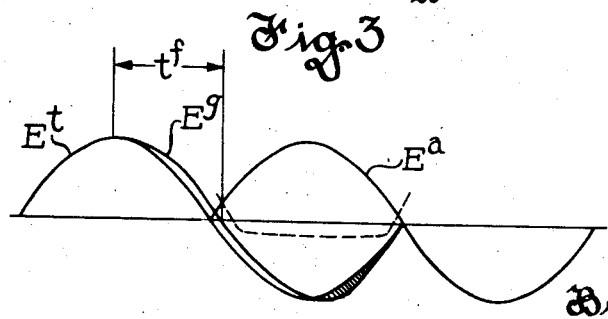

In the drawing, Figure 1 is a diagrammatic view of the system embodying the invention, while Figs. 2 and 3 are diagrams of the voltages which determine the operation of the system.

Referring to Fig. 1, $L^1$, $L^2$ and $L^3$ are three supply lines of a polyphase alternating current system, 1 is a motor having a primary winding $1^a$ and a secondary winding $1^b$. One terminal of the primary winding is directly connected to the line $L^3$ while the two other terminals may be reversibly connected to the lines $L^1$ and $L^2$ by the electromagnetic switches 2 or 3. The switch 2 has a magnet winding $2^a$, normally open main contacts $2^b$ and $2^c$, normally open auxiliary contacts $2^d$ and normally closed auxiliary contacts $2^e$ and $2^f$. Switch 3 has a magnet winding $3^a$, normally open main contacts $3^b$ and $3^c$ and normally closed auxiliary contacts $3^d$ and $3^e$. The controller also includes relays 4 and 5 having respectively magnet windings $4^a$ and $5^a$ and normally open triple contacts $4^b$ and $5^b$.

The armature $1^b$ of the motor is connected through slip rings $S^1$, $S^2$ and $S^3$ respectively to 3 sets of resistances, the resistances connected to $S^1$ being $6^a$, $7^a$ and $8^a$, the resistances connected to $S^2$ being $6^b$, $7^b$ and $8^b$ and the resistances connected to $S^3$ being $6^c$, $7^c$ and $8^c$. The free end of the resistances $8^a$, $8^b$ and $8^c$ are joined together thus forming a center point for the armature circuit. The contacts $4^b$ when closed short-circuit all resistances in the armature circuit except the resistances $6^a$, $6^b$ and $6^c$, while the closure of the contacts $5^b$ short-circuits only resistances $8^a$, $8^b$ and $8^c$. I also provide a relay 9 having a magnet winding $9^a$ and normally open contacts $9^b$ and $9^c$. The winding $9^a$ is connected to the anode $10^b$ of an electron tube 10 which also has a cathode $10^a$ and a grid $10^c$. The cathode $10^a$ is connected to slip ring $S^1$ while the other end of the winding $9^a$ is connected to the slip ring $S^2$.

The system further includes a rectifier 11 which is shown here as being of the thermionic type but which may be of any other suitable type. The rectifier has a cathode $11^a$ and an anode $11^b$, the connections of which will be explained hereinafter. Connected to the grid $10^c$ is a condenser 12 having plates of opposite polarity $12^a$ and $12^b$. The condenser is paralleled by a preferably non-inductive impedance 13. The plate $12^b$ is connected to the cathode $11^a$ through a non-inductive resistance 15, the cathode $11^a$ in turn being connected through an inductance 18 to the slip ring $S^1$. The inductance 18 is paralleled by a condenser 17 having plates of opposite polarity $17^a$ and $17^b$. An additional condenser 19 having plates of opposite polarity $19^a$ and $19^b$ is connected in parallel with the inductance 18, such connection being controlled by the normally closed contact $3^e$. A transformer 20 has its primary winding $20^a$ connected across the slip ring $S^1$ and $S^2$ while one end of its secondary winding is connected to the slip ring $S^1$ and its other end through a non-inductive resistance 21 to the anode $11^b$. A normally open push button switch 21 is connected in circuit with the winding $2^a$ and in series therewith are normally closed contacts $22^a$ of a push button switch 22, said normally closed contacts $22^a$ in turn being connected to line $L^1$. The switch 21 is short-circuited by contacts $2^d$ when the magnetic switch 2 is energized.

The controller operates as follows:

If it is desired to start the motor 1 from rest, push button switch 21 is depressed thereby closing a circuit from line $L^1$ through normally closed contact $22^a$, push button switch 21, coil $2^a$, normally closed contact $3^d$ to line $L^2$. The switch 2 is thus energized and closes normally open main contacts $2^b$ and $2^c$ thereby connecting two of the primary terminals of the motor to the lines $L^1$ and $L^2$, the third primary terminal being permanently connected to the line $L^3$. Closure of contacts $2^d$ short circuits push button switch 21, so that the latter may be released and switch 2 remains energized. The motor accelerates with all of the resistances inserted in the secondary circuit until it reaches a certain speed determined by the value of such resistances.

If it is desired to further accelerate the motor, the switch 23 is closed. This completes an energizing circuit for coils $4^a$ and $5^a$ and switches 4 and 5 short circuit resistances $7^a$, $7^b$, $7^c$ and $8^a$, $8^b$ and $8^c$ and thus cause the motor to attain a higher speed.

The action of the controller in plugging shall now be explained. With the motor running in the forward direction a voltage is induced in the secondary circuit, the frequency and magnitude of which varies with the speed of the armature. This voltage is impressed upon the primary winding $20^a$ of the transformer 20 and a corresponding voltage is induced in the secondary winding $20^b$, the latter winding being so connected that during the half cycle when the terminal $S^1$ is negative with respect to the terminal $S^2$ the anode $11^b$ is negative with respect to the cathode $11^a$. As the tubes 10 and 11 are uni-laterally conducting, current can flow through the tube 11 only during the half cycle when the tube 10 is non-conducting. Therefore a charging current flows through the tube 11 to the condenser 17 only during that half cycle when no current flows between the main electrodes of tube 10, such charging current causing the condenser plate $17^a$ to assume a charge which is positive with respect to the terminal $S^1$ and cathode $10^a$. During the next half cycle when the tube 11 is non-conducting the charge of the condenser 17 tends to leak off through the impedance 18 and the resistance 15, which are so proportioned that a continuous oscillating current of substantially constant frequency of oscillation is set up in the condenser circuit. The voltage impressed upon the tube 10 is designated as $E^a$ in Figure 2 while the voltage induced in the secondary winding is designated as $E^t$ and it will be understood that this voltage is impressed upon the condenser 17 only during the positive half cycle of $E^t$. As soon as the charge of the condenser plate $17^a$ has reached its maximum value which is approximately equal to the voltage impressed upon it by the winding $20^b$, it starts to oscillate in accordance with the curve $E^g$ of Figure 2 and the potential of $17^a$ reaches zero at a time $t^f$ from the moment when it was a maximum, which time is substantially constant independent of the value of such maximum voltage or the frequency of the impressed voltage $E^t$. After having reached zero value the condenser charges in the opposite direction and the system consisting of condenser 17 and impedance 18 continues to oscillate with decreasing amplitude but at a constant frequency for a considerable time if not prevented from doing so, as will be explained presently.

It will be observed that the cathode $11^a$ has at any moment the same potential as the plate $17^a$. The tube 11 becomes conducting whenever the anode $11^b$ is sufficiently positive with respect to the cathode $11^a$. As the voltage induced in winding $20^b$ after the initial charge of the condenser 17 first decreases to a low negative value and then increases again towards zero, the voltage of the anode $11^b$ becomes ultimately positive with respect to the cathode $11^a$ so that the charge of the condenser causes a current flow from plate $17^b$ over winding $20^b$, resistance 21 and tube 11 to plate $17^a$, thus reducing the charge of the condenser and the negative potential of grid $10^c$. By properly adjusting the impedances in this circuit the charge of the condenser 17 is again reduced to zero at approximately the moment when $E^a$ and $E^t$ pass through zero as indicated in Fig. 2.

The function of the condenser 12 and parallel resistance 13 will now be described. Let us assume that the condenser 12 was omitted and the tube 10 was conducting during the positive half cycle and that the instantaneous grid potential 10 reached the critical value at which it just prevents the tube from further conducting, while at the same time the motor speed was slowly changing. Under these conditions the margin between the condition of current conduction and non-conduction through the tube for succeeding half cycles is very small and any sudden variation of the voltage of the supply circuit or minute temporary variations in the tube characteristic or other disturbing influences will alter the potential of the grid $10^c$ sufficiently to change from the condition of discharge to the condition of stoppage of the tube 10 and hence without the steadying effect of the condenser 12 there would be a tendency for the relay 9 and with it for the accelerating switches 4 and 5 to flutter. The condenser 12 provides for a definite and predetermined margin in the operation of the controller in the manner that if the tube 10 starts at a given frequency of the voltage between the terminals $S^1$ and $S^2$ conditions are set up which cause it to continue to start during succeeding working half cycles until discharge is stopped at some other definite frequency, such starting and stopping frequencies being sufficiently far apart to prevent telegraphing due to the disturbances aforementioned.

This action may be explained as follows: When the tube 10 is non-conducting during a negative half cycle, the condenser 12 is charged, the plate $12^a$ being negative with respect to plate $12^b$. The charging current flows from $S^1$ through winding $20^b$, the resistance 21, rectifier 11, the resistance 15, condenser 12, grid $10^c$, cathode $10^a$ to line $S^1$. During the next positive half cycle the condenser 12 discharges through the resistance 13, the voltage of the plate $12^a$ and the grid $10^c$ at the beginning of the following negative half cycle, depending upon the discharge rate through resistance 13. The condenser thus, during succeeding half cycles, raises the potential of the grid 10 until an equilibrium is reached. If, however, the discharge conditions of the oscillating circuit consisting of condenser 17 and inductance 18 and the charge of condenser 12 are such as to permit starting of the tube 10, that is the potential impressed upon the grid $10^c$ by the oscillating circuit being sufficiently positive with respect to the cathode $10^a$, the condenser 12 can discharge not only through the resistance 13 but since the tube 10 is glowing, discharge current can also flow from the grid $10^c$ through condenser 12 and impedances 15 and 18 to the cathode $10^a$ so that the discharge rate of condenser 12 is increased and the voltage impressed upon the grid 10 at the beginning of the positive half cycle is gradually lowered in the reverse sense from that described above, so that the critical instantaneous grid voltage at which the tube 10 responds is lowered.

The resistance 15 is made relatively high so that the voltage impressed upon the condenser 12 at any time depends not only upon the value of the charging voltage but also upon the amount of charge remaining on the condenser at the end of its discharge period with the result that when the tube 10 is conducting the voltage on the condenser 12 is less than it is for the corresponding moment in the cycle when 10 is non-conducting. Thus for a corresponding moment in the cycle when the tube 10 is conducting the negative bias on the grid $10^c$ due to the condenser 12 is reduced and the tendency for the tube 10 to start is thereby increased from that when the tube was non-conducting during the previous positive half cycle. The starting of a discharge thus produces conditions in the tube 10 tending to maintain the tube conducting and vice versa, the stopping of the discharge decreases the tendency of the tube to restart. However, the condenser 12 and the parallel resistance 13 which are inserted in the connection between the grid $10^c$ and the oscillating circuit may, under certain conditions, not be necessary.

The dotted line in Fig. 2 indicates the negative voltage which must be impressed upon the grid of the tube 10 to prevent it from starting conduction of current during the positive half cycle of the alternating voltage impressed upon it, that is during that half cycle in which the anode is positive with respect to the cathode. If the grid potential is at any instant during the positive half cycle more positive than the values represented by the dotted lines, the tube 10 becomes conducting.

Fig. 2 may be considered to represent the conditions at a frequency above the critical frequency. It will be seen from the diagram that during the first part of the half cycle the grid voltage $E^g$ is positive and therefore the tube 10 becomes and stays conducting during the positive half cycle. It thereby energizes the relay winding $9^a$ and the relay closes normally open contacts $9^b$ and $9^c$. In closing normally open contact $9^b$ the relay connects coil $4^a$ in circuit, the current flowing from line $L^1$ through contact $9^b$, coil $4^a$, through normally closed contact $3^d$ to line $L^2$. Switch 4 therefore closes contact $4^b$ and short-circuits some of the armature resistance of the motor thereby increasing its current and torque. On the other hand, when the armature frequency is equal to the critical frequency, the voltages are as represented by Fig. 3. It will be seen, that now the grid voltage $E^g$ is always more negative than the critical voltage of tube 10 during the working half cycle, so that relay 9 does not receive any more current and is deenergized, thereby causing reinsertion of resistance in the armature circuit and decrease of the motor torque.

If it is desired to stop the motor push button switch 22 is depressed thereby opening the current supply to the switch 2 and causing the latter to open the connections to the primary winding of the motor. Simultaneously contact $22^b$ is closed, completing a circuit for the coil $3^a$ of switch 3 from line $L^1$ through contact $22^b$, contact $2^e$ through the coil $3^a$ to line $L^2$. This causes the switch 3 to reverse the connections between the motor and the lines $L^1$ and $L^2$ thus reversing its torque and causing it to slow down. When the switch 3 closes it also opens the normally closed contact $3^d$ which opens the circuit of the switches 4 and 5 thereby reinserting all of the accelerating resistance in the armature circuit of the motor and limiting the reverse torque and the current taken by the motor from the line. The energization of switch 3 also opens contact $3^e$ which disconnects the condenser 19 from the oscillating circuit so that the total capacitance of the circuit and its time constant is reduced, and the tube 10 responds to a relatively higher frequency of the secondary circuit, which may be equal to the primary frequency. When de-energized the switch 2 also closes normally closed contacts $2^f$ and completes a circuit from line $L^1$ through contact $2^f$ and through the coil $5^a$ of switch 5 to line $L^2$. This energizes switch 5, it being assumed that switch 23 is open and causes it to short-circuit the resistances $8^a$, $8^b$ and $8^c$.

The oscillating circuit is adjusted so that the tube 10 is conducting during the positive half cycle as long as the motor has not come to a standstill, in the manner aforedescribed, but as the motor slows down the frequency and the voltage in the secondary circuit decrease while the frequency of the oscillating circuit remains constant, until ultimately the conditions are as represented by Fig. 3, wherein the grid voltage $E^g$ during the entire working half cycle of the voltage $E^a$ is less than the critical voltage required to cause the tube 10 to become conducting. When this condition obtains the relay 9 is deenergized and it opens contact $9^c$ which deenergizes switch 3, the latter disconnecting the motor from the line. By proper adjustment of the oscillating circuit, the time $t^f$ can be made such that the motor is disconnected at the moment when its armature comes to a standstill, that is, when its frequency is just equal to the primary frequency. It will be understood, however, that the time constant of the oscillating circuit may be adjusted to any other value, so that the motor is disconnected from the line either before or after it passes through zero speed.

The system may also be used for maintaining constant the speed of the motor at any desired value in the forward direction rotation. As has been explained when only the condenser 17 is inserted the oscillating system is preferably adjusted to cause the tube 10 to respond when the motor is at standstill, that is, at a frequency equal to the primary frequency of the motor. When the motor operates in the forward direction, that is, when the switch 2 is energized and the switch 3 is deenergized the condenser 19 is connected in parallel with the condenser 17 thereby increasing the time constant of the oscillating system so that the tube 10 responds to a frequency of the secondary circuit of the motor corresponding to some definite speed in the forward direction. Below this speed the conditions which obtain are illustrated by Fig. 2, that is, the frequency of the secondary circuit is such that the relay 9 is energized during each positive half cycle and its normally open contacts $9^b$ are closed thus also energizing switches 4 and 5 and short-circuiting the resistances $7^a$, $7^b$ and $7^c$; and $8^a$, $8^b$ and $8^c$. As soon as the motor has reached the critical speed, however, the conditions are as illustrated in Fig. 3 and the relay 9 is deenergized. It therefore opens the circuit of the switches 4 and 5 and reinserts the resistances above-mentioned thereby slowing down the motor. This again increases the frequency of the secondary circuit thereby causing energization of the relay 9 and the switches 4 and 5 and acceleration of the motor. This intermittent operation of the motor is continued and the average speed of the motor is maintained at a desired value which is determined by the adjustment of the oscillating circuit.

What I claim as new and desire to secure by Letters Patent is:

1. In combination, a power supply, a motor supplied thereby, a circuit supplied with alternating current whose frequency varies with the speed of the motor, means for connecting the motor to said supply including a gaseous discharge tube connected to said alternating circuit and having a grid, an oscillating circuit connected between said alternating circuit and said grid, means to impress a voltage of said alternating circuit upon said oscillating circuit to initiate an oscillating voltage therein and impress it upon said grid to permit current flow through said tube when the frequency of said alternating circuit is above a given frequency approximately equal to the frequency of said oscillating circuit and stop the flow of current through said tube when the frequency of said alternating circuit is below said given frequency.

2. In combination, a power supply, a motor having a primary and a secondary winding, means for connecting said primary winding to said supply including a gaseous discharge tube having a grid, an oscillating circuit connected between said secondary winding and said grid, means to impress a voltage of said secondary winding upon said oscillating circuit to initiate an oscillating voltage therein and impress it upon said grid to permit current flow through said tube when the frequency of said secondary winding is above a given frequency approximately equal to the frequency of said oscillating circuit and stop the flow of current through said tube when the frequency of said secondary winding is below said given frequency.

3. In combination, a power supply, a motor having a primary and a secondary winding, means for connecting said primary winding to said supply including means to reverse said connection at will for plugging said latter means including a gaseous discharge tube having a grid, an oscillating circuit connected between said secondary winding and said grid, means to impress a voltage of said secondary winding upon said oscillating circuit to initiate an oscillating voltage therein and impress it upon said grid to permit current flow through said tube when the frequency of said secondary winding is above a given frequency approximately equal to the frequency of said oscillating circuit and stop the flow of current through said tube when the frequency of said secondary winding is below said given frequency.

4. In combination, a power supply, a motor having a primary and a secondary winding, means for connecting said primary winding to said supply for running, means for reversing said connection for plugging, said latter means including a gaseous discharge tube having a grid, an oscillating circuit connected between said secondary winding and said grid, means to impress a voltage of said secondary winding upon said oscillating circuit to initiate an oscillating voltage therein and impress it upon said grid to permit current flow through said tube when the frequency of said secondary winding is above a given frequency approximately equal to the frequency of said oscillating circuit and stop the flow of current through said tube when the frequency of said secondary winding is below said given frequency.

5. In combination, a power supply, a motor having a primary and a secondary winding, speed regulating means for said motor, means for connecting said primary winding to said supply for running, means for reversing said connections for plugging, a gaseous discharge tube connected to said secondary winding and having a grid and connections for control of said speed regulating and plugging means, an oscillating circuit connected between said secondary winding and said grid, means to impress a voltage of said secondary winding upon said oscillating circuit to initiate an oscillating voltage therein and impress it upon said grid to permit current flow through said tube when the frequency of said secondary winding is above a given frequency approximately equal to the frequency of said oscillating circuit and stop the flow of current through said tube when the frequency of said secondary winding is below said given frequency.

6. In combination, a polyphase power supply, an induction motor having primary and secondary windings, a resistor in circuit with said secondary winding, electromagnetic commutating means for said resistor, electromagnetic means for connecting said primary winding to said supply for running, electromagnetic means for reversing the connections of said primary winding for plugging, a gaseous discharge tube having a grid, said tube being connected to said secondary winding and said reversing and resistor commutating means to supply the latter with current from the former, an oscillating circuit connected between said secondary motor winding and said grid, a transformer having a primary winding connected across the secondary motor winding and a secondary winding, a rectifier connected between said secondary transformer winding and said oscillating circuit to impress a voltage upon the latter to initiate an oscillating voltage therein and impress it upon said grid for permitting current flow through said tube when the frequency of said secondary motor winding is above a given frequency approximately equal to the frequency of said oscillating circuit and stop the flow of current through said tube when the frequency of said secondary winding is below said given frequency.

GLENDON C. BROWN.